(12) United States Patent
Contreras et al.

(10) Patent No.: US 7,299,692 B1
(45) Date of Patent: Nov. 27, 2007

(54) METHOD FOR DETERMINING AN INDICATOR OF THE STRESSES TO WHICH A CONSTRUCTION VEHICLE TIRE IS SUBJECTED

(75) Inventors: Marcos Contreras, Santiago (CL); Jose Angel Moreno, Santiago (CL)

(73) Assignee: Michelin Recherche et Technique, S.A. (CH)

( * ) Notice: Subject to any disclaimer, the term of this patent is extended or adjusted under 35 U.S.C. 154(b) by 0 days.

(21) Appl. No.: 11/484,045

(22) Filed: Jul. 10, 2006

(30) Foreign Application Priority Data

Mar. 16, 2006 (FR) .................................. 06 02477

(51) Int. Cl.
*G01M 17/02* (2006.01)
(52) U.S. Cl. ........................... 73/146; 701/29; 152/153
(58) Field of Classification Search ................. 73/146; 701/29, 50; 152/153
See application file for complete search history.

(56) References Cited

U.S. PATENT DOCUMENTS

| 4,635,739 | A | * | 1/1987 | Foley et al. .................. 177/45 |
| 4,839,835 | A | | 6/1989 | Hagenbuch |
| 4,852,674 | A | * | 8/1989 | Gudat ......................... 177/141 |
| 5,327,347 | A | * | 7/1994 | Hagenbuch .................. 701/50 |
| 5,528,499 | A | * | 6/1996 | Hagenbuch .................. 701/50 |
| 5,650,928 | A | * | 7/1997 | Hagenbuch .................... 701/1 |
| 5,650,930 | A | * | 7/1997 | Hagenbuch .................. 701/50 |
| 5,736,939 | A | * | 4/1998 | Corcoran .................... 340/905 |
| 5,742,914 | A | * | 4/1998 | Hagenbuch .................. 701/35 |
| 6,044,313 | A | | 3/2000 | Gannon |
| 2005/0172709 | A1 | * | 8/2005 | Keller et al. ............... 73/146.3 |

FOREIGN PATENT DOCUMENTS

EP 0162608 12/1988

* cited by examiner

*Primary Examiner*—Andre J. Allen
(74) *Attorney, Agent, or Firm*—Fitzpatrick, Cella, Harper & Scinto

(57) ABSTRACT

The invention relates to a method for determining an indicator of the stresses to which a construction vehicle fire is subjected during a given period in which the product of the load transported by the vehicle and the distance traveled by the vehicle during the period is adjusted by an adjustment factor based on use parameters of the vehicle.

16 Claims, No Drawings

METHOD FOR DETERMINING AN INDICATOR OF THE STRESSES TO WHICH A CONSTRUCTION VEHICLE TIRE IS SUBJECTED

BACKGROUND OF THE INVENTION

1. Field of the Invention

The invention relates to a method for determining an indicator of the stresses to which a vehicle tire is subjected during a given period. In particular, the invention relates to determining an indicator of the stresses to which the tire of a construction vehicle, such as a dumper, is subjected during a duration of use, a construction vehicle being, for example, a vehicle which is intended to bear heavy loads, and which operates in quarries and/or mines.

2. Description of Related Art

A dumper typically comprises a front steered axle having two steered wheels and a rear axle, which is most frequently rigid, having four driving wheels distributed in pairs on each side. An axle is defined as an assembly of the elements enabling the fixed structure of the vehicle to be connected to the ground.

In the case of construction vehicles, particularly those intended for use in mines or quarries for transporting loads, the problems of access and demands of production are leading the manufacturers of these vehicles to increase their loading capacity. It follows that the vehicles are becoming larger and therefore themselves are becoming heavier and can transport greater loads. The current weights of these vehicles may be as much as several hundred tons, and the same applies to the load to be transported; the overall weight may be as much as 600 tons. Since the loading capacity of the vehicle is directly linked to that of the tires, the design of the tires must be adapted to these increasing weights and loads in order to provide tires capable of withstanding the stresses of use.

The dimensions of these tires are therefore large. Consequently, the dimensions of the wheels are also large and the rigidity of the bottom zones of the tires requires the wheels to be made in several parts to allow mounting of the tire on a rim. The operations involved in mounting and demounting the tires in the event of replacement or maintenance are long and tedious. The number of clamping parts which have to be handled during these operations may be greater than 200, and very high levels of clamping torque for these parts are associated therewith. The time taken for these operations is consequently long and therefore detrimental to the productivity sought during working of the mines.

Since current demand is still aimed at increasing the loading capacity of such construction vehicles, the different parameters listed previously have led tire designers to optimize the tires by taking into account the particular use thereof. The inventors therefore set themselves the task of responding to the demand from users, who wish to see a further increase in the loading capacity of the load-carrying machinery, in particular that used in mines, with the performance of the tires being optimized for such applications.

SUMMARY OF THE INVENTION

This aim has been achieved according to the invention by a method for determining an indicator of the stresses to which a construction vehicle tire is subjected over a given period, in which the product of the load transported by the vehicle and the distance traveled by the vehicle during the period is adjusted by an adjustment factor integrating use parameters of the vehicle.

"Use parameters of the vehicle" is understood to mean, in the context of the invention, parameters directly linked to the vehicle, such as its direction, inclination, etc., and also parameters linked to its environment such as temperature, nature of the ground, etc., which may vary during the use of the tires on the vehicle.

According to one preferred embodiment of the invention, the adjustment factor integrates parameters measured in real time during the period, such as the slope of the terrain, the radius of the curves, the overload, the width of the track, snow cover, etc. This is because such use parameters, which are linked either to the conditions of use or to the mode of use, have a direct influence on the stresses to which a given tire of the vehicle is subjected.

The slope of the road or track which the vehicle follows will, in particular, modify the distribution of the loads per tire. A vehicle traveling downhill will, for example, cause a weight transfer onto the front axle, whereas the same vehicle traveling uphill will cause a weight transfer onto the rear axle of the vehicle. In the same manner, a winding route will involve load distributions which vary between the left and the right side of the vehicle according to the direction of the curves which the vehicle takes. Bends to the right or to the left will in fact modify the load distributions between the tires.

Some environment parameters, which may be considered as the conditions of use of the vehicle, and hence of the tires, may modify the stresses to which the tires are subjected.

The temperature, for example, acts on the behavior of the tire and hence on its reactions to the stresses imposed thereon. The nature of the ground, whether it be for example stony terrain or, alternatively, sandy or clayey terrain, has a direct effect on the stresses on the tire.

The snow cover of the terrain, which occurs, for example, in mines worked at high altitude, may likewise contribute to the stresses to which the tire is subjected, but in different ways: on the one hand, by the associated temperature, and on the other hand, by a possible modification of the texture of the soil. There is also the possible necessity of fitting the tires with chains to reinforce the drive ability, in which case the chains would produce additional local stresses on the tires.

The width of the tracks may also be a use parameter which has to be taken into consideration, in particular when the track is narrow and two vehicles have to pass one another, because in such a case it is not uncommon for two tires, each belonging to one of the vehicles, to rub against each other, which results in additional stresses on the tires.

It would appear that, for some of these use parameters, it is possible to define them once and for all for a given type of work. An example of this is a parameter relating to the nature of the ground. Other parameters can be defined over relatively long periods, such as, for example: temperature, snow cover, etc.

On the other hand, some use parameters, such as the value of the slope followed or the trajectory (radius of curvature of a bend), require frequent measurement if it is desired to obtain the most faithful indication possible of the stresses to which each of the tires of a vehicle are subjected.

Such mining operations usually have equipment enabling the mine operator to know at all times the position of the vehicles and also a set of measurements indicating the majority of use parameters such as transported load, temperature, etc. It is thus possible to benefit from the acquisition of these parameters to define the indicator of the stresses to which a construction vehicle tire, e.g., a dumper tire, is subjected over a given period. This indicator may advantageously be determined at a satisfactory frequency, considering the rates of variation of the different use parameters which are to be taken into account, because these acquisitions are usually effected at intervals of less than one minute and may be of the order of half a minute.

Taking into account the different parameters in the adjustment factor is advantageously associated with weighting factors for each of these parameters. This is because the influence of the different parameters on the stresses to which the tires of the vehicle are subjected may be of greater or lesser importance according to the tire considered during the period in question.

The determination of these weighting factors is advantageously defined empirically, or alternatively by modeling, to take account of the specific conditions of the location in which the vehicle is operating and the conditions through which it traverses.

The inventors have demonstrated that the specific nature of dumpers, and more particularly the nature of their use, involves precise knowledge of the conditions of use when it is desired to define the stresses to which the tires are subjected in order to optimize the tires. Precise knowledge means knowledge at all times of the use, the variations in the conditions of use, or more precisely the variation in the parameters mentioned previously, resulting in not inconsiderable variations in the stresses to which the tires are subjected.

According to one preferred embodiment of the invention, the method according to the invention as has just been described is performed to determine the indicator of the stresses to which a dumper tire running on the tracks of a mine is subjected.

One preferred embodiment of the invention provides for the indicator of the stresses to which a dumper tire is subjected to be determined for a period of less than one minute and preferably for a period of less than 40 seconds.

According to an advantageous variant of the invention, the adjustment factor is determined by a computer. This is because the necessity of taking account of the measurements of parameters taken over very short periods is facilitated by using a computer which may be associated with software programmed to take account of the weighting factors corresponding to each of the parameters and predefined for the mine in which the dumper is operating and for each of the tires of a vehicle as a function of the routes it follows.

In other words, the invention thus proposes a method for determining an indicator of the stresses to which a dumper tire traveling on the tracks of a mine is subjected, over a given period, the dumper and/or a device of the mine comprising means for measuring physical parameters in real time, the means being connected to storage elements and to a computer, the method making it possible to establish, using the computer, an indicator of the stresses to which a tire of the dumper is subjected during the period by calculating the product of the load transported by the vehicle as measured by a means for measuring the transported load and the distance traveled by the dumper as measured by a means for measuring the distance, for a given period, the product being adjusted by an adjustment factor integrating at least one physical parameter of the mine and/or conditions of use of the dumper, as measured by a means for measuring the physical parameter.

The invention thus also proposes the use of parameters measured on a construction vehicle, such as a dumper, during its operation and in its environment, for determining an indicator of the stresses to which a tire of the vehicle is subjected.

Furthermore, studies have shown that the use and maintenance of dumper tires are very specific and have to be performed with a lot of attention by specialists. This is because optimization of the life of this type of tire is based on precise use both with regard to the monitoring of pressure, permutations, changes of direction, repairs, etc. It is usually recognized that the best specialist in the tire is its designer and hence the manufacturer. It is thus consequently desirable for the manufacturer of the tire to have the possibility of tracking the tire, its use and its conditions of use. One possible solution is for the manufacturer to remain the owner of the tire and for the latter to be leased to the user. In such a situation, the tire therefore is no longer sold, but becomes a leased product for which the price to be paid remains to be determined and may then advantageously not be a standard cost, but a cost which is a function of the use.

The inventors thus propose basing this cost of leasing a dumper tire on the real use of the tire and, in particular, on the total of the indicators of the stresses to which the tire is subjected for given periods.

The invention therefore thus proposes using the total of the indicators of the stresses to which a dumper tire is subjected over given periods to determine the amount to be paid for a duration of use corresponding to the total of the periods.

According to one advantageous embodiment of the invention, the amount to be paid is also determined from a monetary coefficient set beforehand relative to the price at which the tire would be sold.

Advantageously also, this determination of the lease cost is intended to be substituted by a residual value determined as a function of what has already been paid; such a residual value is applied in the event of an accident or irreparable damage caused to the tire owing to the conditions and the location of use.

It turns out that such determination of the cost of the tires of a dumper on one hand contributes to good operation of the tires owing to the optimum conditions of use, and on the other hand indirectly results in an increase in the life of the tire. This is because this principle of determining the cost, and hence the principle of leasing the tires, is linked to the fact that the manufacturer of the tire remains the owner thereof and thus, owing to the tracking of the tires by the owner, promotes use under the most favorable conditions possible in particular in terms of inflation pressure, positioning of the tire on the vehicle, etc. It follows that the average life of the tires which travel under better conditions will be increased, which results in improved productivity of the tire.

Other advantageous details and characteristics of the invention will become apparent hereafter from the description of an example of embodiment of the invention.

DETAILED DESCRIPTION OF THE PREFERRED EMBODIMENT

The example described below has been produced using a set of dumpers, each fitted with six tires of type 40.00R57, operating on the tracks of an open-cast mine at an altitude of 3100 meters.

The different use parameters taken into account are as follows. As far as the environment parameters are concerned, those taken into account are the nature of the ground, the temperature and the snow cover. As far as the use parameters are concerned, those taken into account are the route taken by the dumpers over the tracks and, more precisely, the slopes and curves of the tracks and their widths and also any overloads which may possibly be transported.

The weighting factors associated with each of these parameters are defined initially as a function of the mine, the vehicle and the tire considered on the vehicle. This is because the stresses to which each of the six tires of the vehicle is subjected are not necessarily equivalent for a given parameter. For example, the parameter corresponding to the width of the tracks will have no effect on tires axially to the inside on an axle, i.e., tires which do not have a sidewall exposed to any friction against another vehicle when passing close by each other. In the same manner, the dumper vehicle entering a curve or, alternatively, sloping passages, results in load transfers, and the stresses to which certain tires are subjected increase, whereas they decrease for other tires.

The indicator "Ct" of the stresses to which a dumper tire is subjected for a given period "t" can be expressed as follows:

$$Ct = Fc \times (P \times D),$$

"Fc" being the adjustment factor for the period "t", "P" being the load transported by the dumper, i.e., the weight of the material being transported, and "D" the distance traveled by the dumper during this period "t".

The adjustment factor "Fc" is also, as explained previously, determined from the total of values "fi" corresponding to the different use parameters, each of the values "fi" being multiplied by a weighting factor "ki".

The adjustment factor can thus be expressed as follows:

$$Fc = 1 + \Sigma(ki \times fi).$$

Each of the values "fi", associated with one of the use parameters taken into account, is defined beforehand and may vary as a function of the status of the parameter. The weighting factor with which it is associated will itself depend in particular on the tire in question, the influence of a parameter possibly varying from one tire to the other.

Measurement of the different use parameters translated into "fi" values will thus make it possible to determine for each of the periods in question an indicator of the stresses to which each of the tires is subjected.

Collecting this data may provide other advantages. For example, it is possible to provide the user, that is to say the driver of the vehicle, with advice, in particular by making him correct his driving under certain circumstances in order to reduce the stresses to which certain tires are subjected over a given period. For example, advising him to slow down over a zone in which this does not seem necessary may make it possible to reduce later braking and hence the weight transfer created on the tires of the front axle of the vehicle. Knowledge of the stresses to which the different tires are subjected during the different periods of their journey may make it possible to recommend such driving choices with the aim possibly of better distribution over time of the stresses to which a tire is subjected. This is because it may be desirable to increase the stresses to which a tire is subjected over a first period in order to avoid a very large value of the stresses over a later period. Such an adjustment of the driving may thus make it possible to prevent making the tires be subjected to excessively large stress values resulting in possible damage to the tire.

As already mentioned previously, the data on the stresses to which each of the tires is subjected over a period may also make it possible to determine the cost to be charged for leasing a tire.

In accordance with what is indicated above, the lease charge "Lt" to be paid for leasing a dumper tire for a given period can be calculated as follows:

$$Lt = K \times Ct,$$

K being a monetary coefficient pre-established as a function in particular of the production costs and the costs of the raw materials.

In the event of an incident resulting from the conditions of use and leading to irreparable damage to the tire, the price to be paid for leasing the tire is substituted by a residual price to pay which is a function of what has already been paid and the estimate which may be made of the lease charges not yet received owing to this degradation. This estimate is based on experience already acquired with these tires under the same use conditions.

This method of charging for tires in the form of a lease or rental charge, as already explained, has certain advantages since the tire remains the property of the manufacturer. This is because the monitoring and the better compliance with the operating instructions for the tires will make it possible to increase substantially their duration of use. The gain may be even more advantageous if it is considered that the number of periods of immobilization of the dumpers for changing tires will thus decrease.

Furthermore, it turns out that for the user, the lease charge only has to be paid when the dumper is operational, since firstly a distance must be traveled and secondly the dumper must be loaded, so that the stresses to which the tire is subjected are other than zero, and thus a cost to be paid is calculated.

What is claimed is:

1. A method for determining an indicator of stresses to which a vehicle tire is subjected during a period, the method comprising the steps of:
    determining a load transported by the vehicle during the period;
    determining a distance traveled by the vehicle during the period;
    determining a product of the load transported by the vehicle and the distance traveled by the vehicle during the period;
    determining at least one use parameter of the vehicle; and
    adjusting the product of the load and the distance by an adjustment factor based on the at least one use parameter of the vehicle.

2. The method according to claim 1, wherein the adjustment factor is determined based on at least one use parameters measured in real time during the period, the at least one measured use parameter relating to a physical characteristic comprising at least one of: a slope of terrain traversed by the vehicle, a radius of a curve traversed by the vehicle, an overload amount carried by the vehicle, a width of a track traversed by the vehicle, and an amount of snow cover in an operation area of the vehicle.

3. The method according to claim 1, wherein the vehicle is a dumper, and the indicator of the stresses to which the vehicle tire is subjected relates to the dumper running on tracks of a mine or quarry.

4. The method according to claim 1, 2, or 3, wherein the adjustment factor is based on a sum of use parameters, each multiplied by a corresponding weighting factor.

5. The method according to claim 4, wherein the indicator of the stresses to which the vehicle tire is subjected is determined for a period of less than about one minute.

6. The method according to claim 4, wherein the indicator of the stresses to which the vehicle tire is subjected is determined for a period of less than about 30 seconds.

7. The method according to claim 1, wherein the adjustment factor is determined by a computer.

8. The method according to claim 1, further comprising determining a leasing cost for a duration of use of the vehicle tire based on the indicator of stresses.

9. The method according to claim 8, wherein the duration of use corresponds to a plurality of periods, and the leasing cost for the duration of use is based on a total of the stress indicators for the periods.

10. A method for determining an indicator of stresses to which a construction vehicle tire is subjected during a use period, the construction vehicle comprising means for measuring at least one physical parameter in real time, the means being connected to storage elements and to a computer, the method making it possible to establish, using the computer, the indicator of the stresses to which the construction vehicle tire is subjected during the use period by:

determining a load transported by the vehicle during the use period, using a means for measuring a transported load;

calculating a distance traveled by the vehicle during the use period, using a means for measuring the distance;

calculating the product of the load transported by the vehicle and the distance traveled by the vehicle; and adjusting the product of the load and the distance by an adjustment factor based on the at least one physical parameter, as measured by the measuring means.

11. The method according to claim 10, wherein the indicator of stresses is determined based at least in part on parameters measured during operation of the construction vehicle in its operational environment.

12. The method according to claim 10, further comprising determining a leasing cost for a duration of use of the construction vehicle tire based on the indicator of stresses.

13. The method according to claim 12, wherein the duration of use corresponds to a plurality of use periods, and the leasing cost for the duration of use is based on a total of the stress indicators for the use periods.

14. The method according to claim 12 or 13, wherein the leasing cost is further based on a predetermined monetary coefficient.

15. The method according to claim 12 or 13, wherein, in the event of irreparable damage to the tire, a residual value is substituted for the determined leasing cost.

16. The method according to claim 15, wherein the residual value is determined based on a production cost and a raw materials cost of the tire.

* * * * *

UNITED STATES PATENT AND TRADEMARK OFFICE
CERTIFICATE OF CORRECTION

PATENT NO. : 7,299,692 B1  
APPLICATION NO. : 11/484045  
DATED : November 27, 2007  
INVENTOR(S) : Marcos Contreras et al.

It is certified that error appears in the above-identified patent and that said Letters Patent is hereby corrected as shown below:

TITLE PAGE, ITEM [73] ASSIGNEE

"Michelin Recherche et Technique, S.A. (CH)" should read
--Michelin Recherche et Technique S.A., Granges-Paccot (CH)--.

[65] PRIOR PUBLICATION DATA

Insert: --[65] Prior Publication Data
US 2007/0220962 A1 Sept. 27, 2007--.

[56] REFERENCES CITED

Foreign Patent Documents
"0162608" should read --0 162 608--.

[57] ABSTRACT

Line 2, "fire" should read --tire--.

COLUMN 2

Line 35, "clayey" should read --clay-like--.
Line 43, "drive ability," should read --drive-ability--.

Signed and Sealed this

Tenth Day of June, 2008

JON W. DUDAS  
*Director of the United States Patent and Trademark Office*